United States Patent Office 2,790,807
Patented Apr. 30, 1957

2,790,807
CERTAIN CARBETHOXY DERIVATIVES OF 3,5-PYRAZOLIDINEDIONES

Kuno Wagner, Erwin Müller, and Otto Bayer, Leverkusen, and Werner Grab, Wuppertal-Elberfeld, Germany, assignors to Schenley Industries, Inc., New York, N. Y., a corporation of Delaware No Drawing. Application November 28, 1955,
Serial No. 549,547
Claims priority, application Germany November 29, 1954
6 Claims. (Cl. 260—310)

This invention relates, generally, to novel organic chemical compounds and, more particularly, it relates to certain new and useful N-carbethoxy-3,5-pyrazolidinedione derivatives. Compounds of this type are useful agents in human therapy, being used as analgesics, and also in treatment of arthritis, gout, rheumatoid arthritis, bursitis, and acute arthritis of the joints.

The novel N-carbethoxy-3,5-pyrazolidinedione derivatives according to this invention may be represented by the formula (keto-form):

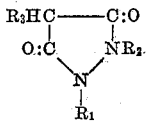

wherein $R_1$ is a radical chosen from the group consisting of phenyl and carbethoxy, $R_2$ is a radical chosen from the group consisting of hydrogen and carbethoxy, either $R_1$ or $R_2$ being carbethoxy in every instance; and $R_3$ being a radical chosen from the group consisting of hydrogen, phenyl, and n-butyl. Within the spirit of this invention are embraced, also, the sodium and other alkali-metal salts of the foregoing compounds, obtainable by treating the keto-form compounds with alkali-metal hydroxide solutions whereby the enol-form compounds are produced and converted into readily water-soluble alkali-metal salts.

More specifically, the novel compounds according to this invention consist of: 1,2-bis-carbethoxy-3,5-pyrazolidine-dione, 1-phenyl-2-carbethoxy-3,5-pyrazolidinedione, 1,2-bis-carbethoxy-4-phenyl-3,5-pyrazolidinedione, 1-carbethoxy-4-phenyl-3,5-pyrazolidinedione, 1,4-bis-phenyl-2-carbethoxy-3,5-pyrazolidinedione, 1-carbethoxy-3,5-pyrazolidinedione, 1-carbethoxy-4-n-butyl-3,5-pyrazolidinedione; and alkali-metal salts thereof.

It is known that reactive derivatives of malonic acid or C-substituted malonic acids, such as their esters, halides or ester-halides, may be reacted with hydrazine or substituted hydrazines, in the presence of a condensing agent or acid acceptor, to produce 3,5-pyrazolidinediones. For example, C-n-butylmalonic acid dichloride may be reacted with sym-bis-phenylhydrazine to produce butazolidine (1,2-bis-phenyl-4-n-butyl-3,5-pyrazolidinedione), a substance that has been used in human therapy as an analgesic, and in treatment of arthritis, gout, rheumatoid arthritis, bursitis, and acute arthritis of the joints. Heretofore, however, this reaction has been limited in its application to strongly basic substituted hydrazines, such as sym-bis-phenylhydrazine, and it has not been applied to, nor has it been thought to be applicable to, reactions involving hydrazine derivatives of merely slight basicity.

It is now found that this reaction may be utilized with hydrazine derivatives of merely slight basicity, such as esters of hydrazine-carboxylic acids, in production of certain new and useful compounds, namely, the N-carbethoxy-3,5-pyrazolidinedione derivatives of this invention, and it is found, further, that these compounds may be obtained in this manner by reaction in an essentially anhydrous, substantially non-polar organic solvent reaction medium without need for the use of an acid acceptor. More particularly, it is found that esters, especially ethyl esters, of hydrazine mono- and sym-bis-carboxylic acids, and of 1-phenyl-2-carboxyhydrazine, may be reacted with reactive malonic acid or C-substituted malonic acid derivatives to obtain the N-carbethoxy-3,5-pyrazolidinedione derivatives of this invention. Preferably, this reaction is performed using a malonic or substituted malonic acid halide, for instance the chloride, and it is performed in an essentially anhydrous, substantially non-polar organic solvent, such as benzene or ether, whereby hydrogen chloride is evolved as the reaction proceeds and passes from the reaction mixture, in which it has but little solubility. In general, the reaction proceeds more rapidly as the basicity of the selected hydrazine compound increases, i. e., esters of the mono-carboxy-hydrazines react more speedily than do sym-bis-carboxyhydrazine esters.

As will be obvious to one skilled in the chemical arts, the compounds of this invention, being diones, are capable of existing in either of two tautomeric forms: the keto-form as represented in the formula above set fourth, and its enol-form tautomer. The keto-form is favored by acidic environment; the enol-form, by basic environment; and the conversion of one of the tautomers to the other can be effected by merely changing the environmental conditions. The enol-form tautomers, it is found, are readily susceptible to decarbalkoxylation in aqueous alkaline solutions; thus, the bis-carbalkoxy-compounds can be converted to mono-carbalkoxy-compounds, and, in like manner, 3,5-pyrazolidinediones may be obtained by decarbalkoxylation of mono-N-carbalkoxy-3,5-pyrazolidinediones.

By treatment with inorganic or organic bases, the N-carbethoxy-3,5-pyrazolidinedione derivatives according to the present invention may be converted into salts that are more or less water-soluble. Reaction of the derivatives with alkyl chloro-formates chiefly results in production of enol-forms of the derivatives. The compounds according to this invention are of a type useful in therapy as analgesics and in treatment of arthritis, gout, rheumatoid arthritis, busitis, and acute arthritis of the joints. It is notable, for instance, that the anti-inflammatory activity of 1,2-carbethoxy-3,5-pyrazolidinedione and of 1-phenyl-2-carbethoxy-3,5-pyrazolidinedione is at least equal to that of butazolidine, while these new compounds are much better tolerated and produce fewer side reactions in test animals.

To facilitate a fuller and more complete understanding of the subject matter of this invention and of the presently preferred methods for preparing the novel compounds in accordance therewith, certain specific examples herewith follow. It is clearly to be understood, however, that these examples are provided by way of illustration, merely, and that they are not to be construed as imposing any limitations on the invention as defined by the claims.

EXAMPLE 1

*Synthesis of 1,2-bis-carbethoxy-3,5-pyrazolidinedione.*—About 70.5 parts by weight of malonic acid dichloride ($Cl.CO.CH_2.CO.Cl$) is introduced slowly and portionwise, as by dropping, into a suspension of 88.1 parts by weight of finely divided sym-bis-carbethoxyhydrazine in about 220 parts by weight of benzene. The addition is performed at ordinary room temperature (ca. 20° C.) and the mixture is stirred throughout the addition to assure thorough mixing of the reactants. The temperature of the mixture is raised to about 50° C. within a period of approximately one hour, hydrogen chloride is evolved, and the suspended sym-bis-carbethoxyhydrazine slowly passes into solution. After about six to eight hours at this temperature, the suspended material is completely dissolved; then heating at this temperature is continued for an additional period of about two hours, after which a current of dry nitrogen is passed through the mixture to blow out dissolved hydrogen chloride. The desired reaction product separates from the mixture after a brief period as well-shaped, slightly yellowish needles which, after being recrystallized from a minimal quantity of anhydrous benzene, yield colorless needles, melting at 113–114° C.

EXAMPLE 2

*Synthesis of 1-phenyl-2-carbethoxy-3,5-pyrazolidinedione.*—About 42.3 parts by weight of malonic acid dichloride is slowly introduced into a solution of 54.7 parts by weight of 1-phenyl-2-carbethoxyhydrazine in about 286 parts by weight of anhydrous ether, the mixture being stirred and cooled by an ice-bath throughout the addition. The desired reaction product soon begins to separate from the reaction mixture; separation is complete after standing about two or three hours. The product, after being recrystallized from a minimal quantity of anhydrous benzene, is obtained as colorless needles, melting at 110–111° C.

EXAMPLE 3

*Synthesis of 1,2-bis-carbethoxy-4-phenyl-3,5-pyrazolidinedione and 1-carbethoxy-4-phenyl-3,5-pyrazolidinedione.*—About 43.4 parts by weight of C-phenylmalonic acid dichloride is introduced, at room temperature and with constant stirring, into a suspension of 35.2 parts by weight of finely divided sym-bis-carbethoxyhydrazine in about 176 parts by weight of anhydrous benzene and, within a period of about one hour, the temperature of the mixture is raised to approximately 50° C. Reaction ensues and hydrogen chloride is evolved. After standing for about twelve hours, a clear yellow solution is obtained which is concentrated under vacuum at room temperature, then it is diluted with about 143 parts by weight of anhydrous ether. This ethereal solution is shaken with aqueous sodium hydroxide solution (1 normal), whereby the enol-tautomer of 1,2-bis-carbethoxy-4-phenyl-3,5-pyrazolidinedione is formed and converted to its sodium salt, which dissolves in the aqueous phase. The aqueous phase enol-tautomer spontaneously decarbethoxylates upon standing at room temperature and, by heating the mixture briefly at about 50° C., this reaction is substantially completed, yielding a solution which, upon acidification with a mineral acid, produces a powdery precipitate of 1-carbethoxy-4-phenyl-3,5-pyrazolidinedione and evolution of carbon dioxide. After recrystallization from a minimal quantity of benzene (anhydrous), the product is obtained as nacreous, shining leaflets, melting at 210° C.

EXAMPLE 4

*Synthesis of 1-carbethoxy-4-phenyl-3,5-pyrazolidinedione.*—About 21.7 parts by weight of C-phenylmalonic acid dichloride, dissolved in approximately 72 parts by weight of anhydrous ether, is added, while stirring, to a solution of 10.4 parts by weight of mono-carbethoxyhydrazine in about 143 parts by weight of anhydrous ether, and the mixture is cooled to a temperature of 0° to 5° C. during the addition. The desired reaction product, together with mono-carbethoxyhydrazine hydrochloride, soon separates from the reaction mixture; after standing about one hour, the mixture is filtered, the filtration residue is dissolved in sodium hydroxide solution (1 normal), the solution is acidified and the product which separates, pure 1-carbethoxy-4-phenyl-3,5-pyrazolidinedione, is recovered following three recrystallizations from benzene. It melts at the same temperature as this substance when obtained as described in Example 3, 210° C.

EXAMPLE 5

*Synthesis of 1,4-bis-phenyl-2-carbethoxy-3,5-pyrazolidinedione.*—A solution of about 43.4 parts by weight of C-phenylmalonic acid dichloride in about 36 parts by weight of anhydrous ether is introduced into a solution of 36.4 parts by weight of 1-phenyl-2-carbethoxyhydrazine in 143 parts by weight of anhydrous ether, stirring the mixture throughout the addition and cooling it to a temperature of 0° to 5° C. Thereafter, the mixture is allowed to stand at ordinary room temperature for about three hours, then the yellowish ethereal solution is poured into 300 parts by weight of ice-water and free hydrochloric acid present is neutralized by addition of 532 parts by weight of sodium hydroxide solution (1 normal) at about 0° C. and with stirring during the addition. A further 266 parts by weight of sodium hydroxide solution (1 normal) is added and the aqueous layer, containing the sodium salt of the enol-tautomer of the desired reaction product, is separated from the ethereal layer. The aqueous solution is blown with a strong current of air to remove dissolved ether, then it is acidified by addition of mineral acid, the separated desired reaction product is recovered by filtration of the mixture, and it is purified by extraction with anhydrous ether. It melts at 70° to 73° C.

EXAMPLE 6

*Snythesis of 1-carbethoxy-3,5-pyrazolidinedione.*—About 28.2 parts by weight of malonic acid dichloride is introduced, while stirring and at ordinary room temperature, into a solution of 20.8 parts by weight of mono-carbethoxyhydrazine in 286 parts by weight of anhydrous ether. The desired reaction product immediately begins to separate as a power. It is recovered, washed with ether, and recrystallized from a minimal quantity of water, yielding colorless, elongate needles, melting at 188° C.

EXAMPLE 7

*Synthesis of 1-carbethoxy-4-n-butyl-3,5-pyrazolidinedione.*—About 9.9 parts by weight of C-n-butylmalonic acid dichloride is introduced, while stirring and at a temperature of 0° to 5° C., into a solution of 5.2 parts by weight of mono-carbethoxyhydrazine in 72 parts by weight of anhydrous ether. The desired reaction product, which separates from the reaction mixture as a powder, is recovered therefrom and recrystallized from a minimal quantity of water, yielding small, needle-like crystals, melting at 159° C.

Having thus described the subject matter of this invention, what it is desired to secure by Letters Patent of the United States is:

1. A N-carbethoxy-3,5-pyrazolidinedione derivative represented by the formula:

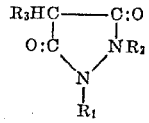

wherein $R_1$ is a radical chosen from the group consisting of phenyl and carbethoxy, $R_2$ is a radical chosen from the group consisting of hydrogen and carbethoxy, at least one of $R_1$ and $R_2$ being carbethoxy; and $R_3$ being a radical chosen from the group consisting of hydrogen, phenyl and n-butyl.

2. A compound as defined in claim 1 wherein $R_1$ and $R_2$ are carbethoxy and $R_3$ is hydrogen.

3. A compound as defined in claim 1 wherein $R_1$ is phenyl, $R_2$ is carbethoxy, and $R_3$ is hydrogen.

4. A compound as defined in claim 1 wherein $R_1$ and $R_2$ are carbethoxy and $R_3$ is phenyl.

5. A compound as defined in claim 1 wherein $R_1$ is carbethoxy, $R_2$ is hydrogen, and $R_3$ is phenyl.

6. A compound as defined in claim 1 wherein $R_1$ is phenyl, $R_2$ is carbethoxy, and $R_3$ is phenyl.

References Cited in the file of this patent

UNITED STATES PATENTS 2,427,911    Kendall et al. _____ Sept. 23, 1947